United States Patent [19]

Le Grady

[11] 3,905,286

[45] Sept. 16, 1975

[54] BARBECUE GRILL

[76] Inventor: Carl F. Le Grady, 1024 N. 21st Ave., Phoenix, Ariz. 85009

[22] Filed: May 3, 1973

[21] Appl. No.: 357,074

Related U.S. Application Data

[63] Continuation-in-part of Ser. No. 231,969, March 6, 1972, abandoned.

[52] U.S. Cl. ............... 99/450; 126/25 R; 211/181
[51] Int. Cl.² ..................... A47J 37/07; F24B 3/00
[58] Field of Search ............... 99/450, 448–449, 99/421; 126/9, 25, 29–30; 211/88, 90, 177, 211/178, 181

[56] References Cited
UNITED STATES PATENTS

| | | | |
|---|---|---|---|
| 913,148 | 2/1909 | McNulty | 99/450 UX |
| 2,122,275 | 6/1938 | Bitney | 126/25 R |
| 2,216,457 | 10/1940 | Salisbury | 99/450 X |
| 2,469,698 | 5/1949 | Morgan | 99/449 UX |
| 2,791,959 | 5/1957 | Pirz | 99/421 H |
| 2,985,164 | 5/1961 | Imoto | 99/450 X |
| 3,013,670 | 12/1961 | Mayer | 211/181 X |
| 3,306,281 | 2/1967 | Hoebel | 126/25 R |
| D91,639 | 2/1934 | Stulik | 126/25 R UX |

FOREIGN PATENTS OR APPLICATIONS

| | | | |
|---|---|---|---|
| 520,135 | 4/1940 | United Kingdom | 99/450 |
| 526,818 | 6/1931 | Germany | 99/450 |

Primary Examiner—Peter Feldman
Assistant Examiner—Arthur O. Henderson

[57] ABSTRACT

A barbeque grill having an outline frame; a plurality of spaced apart generally parallel grill bars fixed thereto; legs pivoted into downwardly diverging relation relative to said frame and said bars to support said grill; two pairs of said legs being disposed so as to support said grill at opposite sides and ends of said frame; and braces slidably coupling said grill bars and said legs for triangular bracing of said legs relative to said frame; said legs and said braces all being pivotal into generally parallel relation to a plane on which said grill bars are disposed for collapsing said grill, said legs, and braces into a thin compact assembly.

8 Claims, 7 Drawing Figures

BARBECUE GRILL

This application is a continuation in part of my co-pending application for Barbeque Grills, Ser. No. 231,969, filed Mar. 6, 1972 now abandoned.

BACKGROUND OF THE INVENTION

Outdoor cooking has been done for a great many years over open fires by means of barbeque grills which are generally designed to support steaks or cooking utensils over a fire. Many of these grills have been constructed of very heavy wire and are consequently relatively expensive and heavy. It has been a problem to provide a lightweight collapsible barbeque grill which will support substantial loads over a fire, and expecially when the temperature of the grill bars and frame of the grill are at elevated temperatures. It has been a problem to provide a lightweight grill of substantial size which is strong and yet desirable for backpacking.

Heretofore, barbeque grills which have been made of relatively small gauge wire have tended to deflect under load when disposed over a fire and accordingly many of the prior art barbeque grills have been made of relatively heavy wire to avoid such conditions of deflection. This has created relatively heavy and expensive barbeque grills which are undesirable in many respects particularly for backpacking purposes.

SUMMARY OF THE INVENTION

The present invention relates to a lightweight, yet strong, barbeque grill which is economical to produce and very desirable in its operating characteristics, as well as its compact collapsed disposition when not in use.

The invention includes a lightweight frame having two pairs of supporting legs, one pair being pivoted on an axis substantially parallel with the grill bars thereof, and another pair of legs being pivoted on the frame of an axis at right angles to the grill bars thereof, whereby the frame may be supported intermediate its ends which are parallel to the grill bars, and whereby the entire grill may be made of light gauge wire due to the manner in which the two sets of legs support the grill.

The invention further comprises novel slide braces which are slidable on the grill bars of the barbeque grill and are also coupled to the grill supporting legs so as to provide for triangular bracing when the legs are supporting the grill and to permit slidable disposition of the braces on the grill bars so as to permit the pivotal movement of the legs as well as the braces into a position substantially parallel with the plane of the grill bars for collapsing the entire barbeque assembly into a compact disposition.

Accordingly, it is an object of the present invention to provide a lightweight barbeque grill which carries a substantial load in proportion to the amount of material or size of wire of which said barbeque grill is made.

Another object of the invention is to provide a lightweight barbeque grill which may be of substantial size and yet carry substantial loads over an open fire.

Another object of the invention is to provide novel slide brace means for triangularly bracing the grill bars, the frame, and the legs of the barbeque grill of the invention so that it will carry substantial loads over a fire and yet be of lightweight construction.

Further objects and advantages of the invention may be apparent from the following specification, appended claims and accompanying drawings.

DESCRIPTION OF THE PREFERRED EMBODIMENTS

Figure 1:
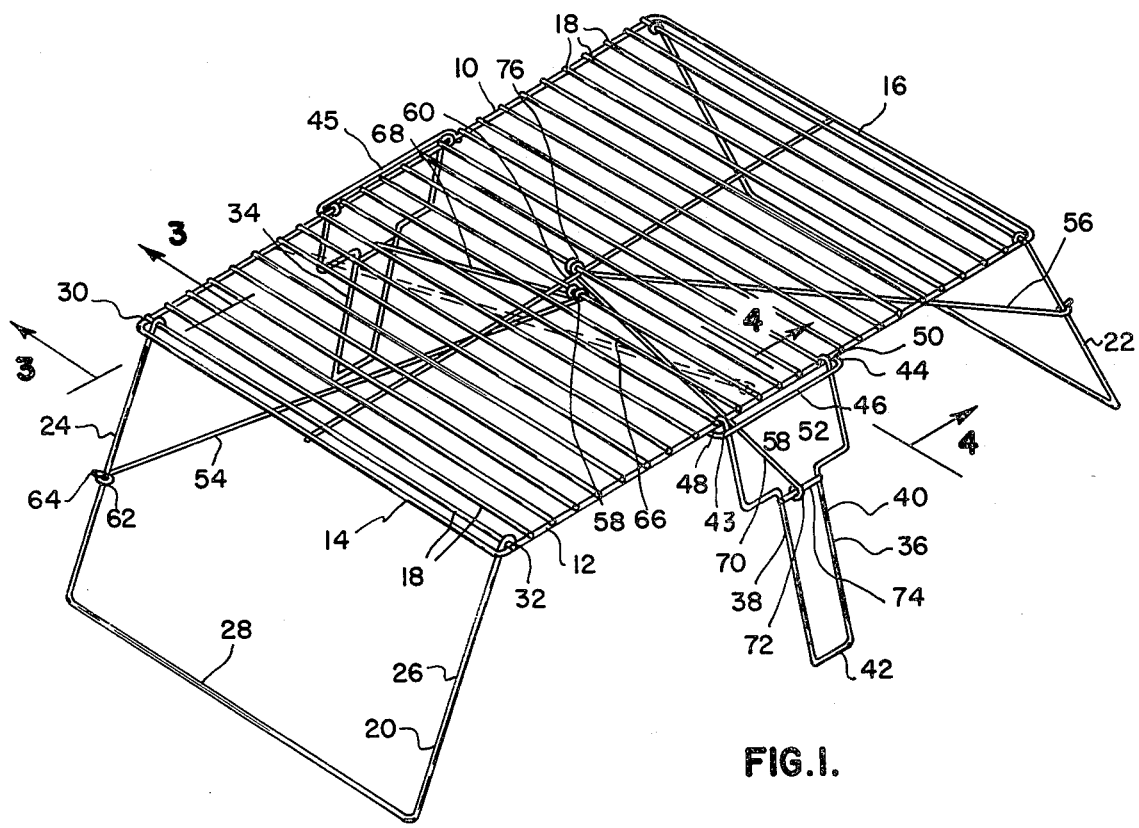
FIG. 1 is a perspective view of a barbeque grill in accordance with the present invention, showing the grill with two pairs of legs, each pair being disposed in downwardly diverging relation to support the grill, and showing slide braces in a triangular bracing disposition relative to the grill bars and the legs of the barbeque grill.

As shown in FIG. 1 of the drawings, the brabeque grill of the invention is provided with an outline frame, preferably made of wire, and formed into an endless loop structure, butt welded so as to provide an outline frame of generally rectangular shape, it being understood that the outline frame may be other configurations; however, the outline shape such as shown in FIG. 1 of the drawings is by way of example only.

The frame is provided with a pair of first spaced apart portions 10 and 12 which are normally horizontal, and a second paid of spaced apart frame portions 14 and 16. Al of these portions 10, 12, 14, and 16 are of a single piece of wire, and as hereinbefore described, butt welded to form an endless generally loop shaped frame.

A plurality of grill bars 18 are disposed in generally parallel spaced apart relationship to each other, and opposite ends of these grill bars 18 are fixed to the first pair of frame portions 10 and 12 and these grill bars 18 are generally parallel to the second pair of frame portions 14 and 16, all as shown best in FIG. 1 of the drawings.

A pair of support legs 20 and 22 support opposite ends of the barbeque grill of the invention and each support leg is provided with a pair of leg portions 24 and 26 interconnected by an integral horizontal bearing and support portion 28. This bearing and support portion 28 is at the lower extremity of each leg, and upper ends of the leg portions 24 and 26 are provided with respective bearing loops 30 and 32 which surround and are pivoted on one of the grill bars 18 adjacent to one of the respective frame portions 14 and 16. Inasmuch as the legs 20 and 22 are similar, only the leg 20 is described in detail.

A pair of auxiliary legs 34 and 36 is provided to support the first frame portions 10 and 12. The legs 34 and 36 are similar and therefore the leg 36 only will be described in detail.

The leg 36 is provided with a pair of upwardly extending leg portions 38 and 40, interconnected by a generally horizontal bearing and support portion 42 at the lower extremity of the leg. Upper ends of the leg portions 38 and 40 are provided with respective bearing loop portions 43 and 44 which are disposed in surrounding relation with the frame portion 12 and pivoted thereon.

Figure 2:
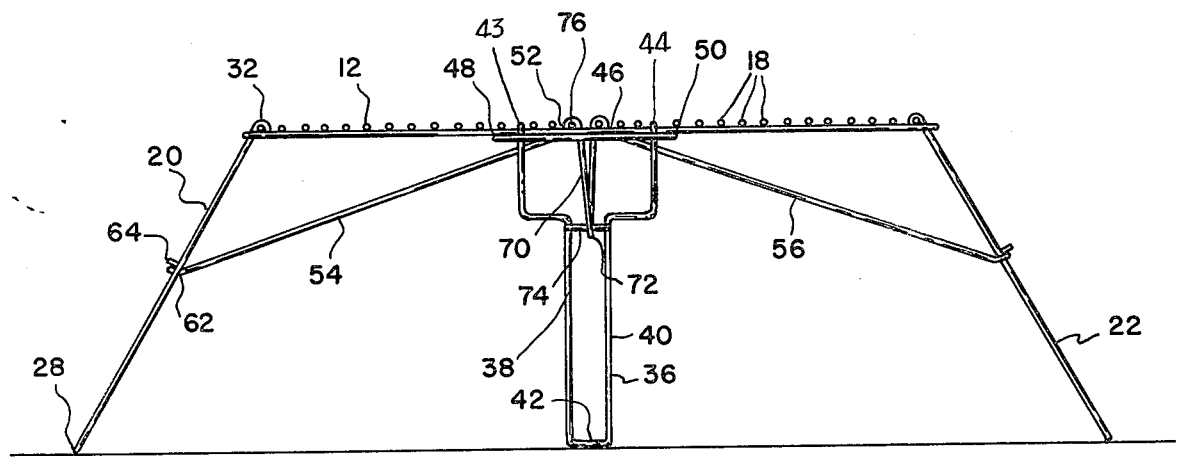
FIG. 2 is a side elevation view of the barbeque grill shown in FIG. 1 of the drawings.
Figure 4:
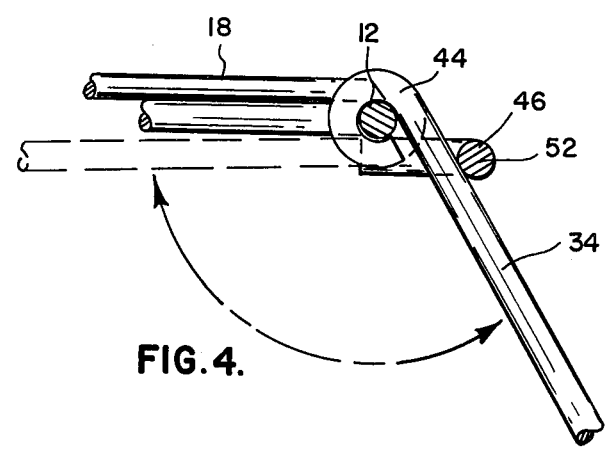
FIG. 4 is an enlarged fragmentary sectional view taken from the line 4—4 of FIG. 1.

A brace member 46 is provided with opposite ends 48 and 50, secured to the frame portion 12, and the brace member 46 is provided with an intermediate brace bar portion 52 which is engaged by the leg portions 38 and 40, as shown best in FIGS. 1, 2 and 4 of the drawings, when the legs 34 and 36 are disposed in downwardly diverging position, as shown in FIGS. 1 and 4 of the drawings.

Figure 3:
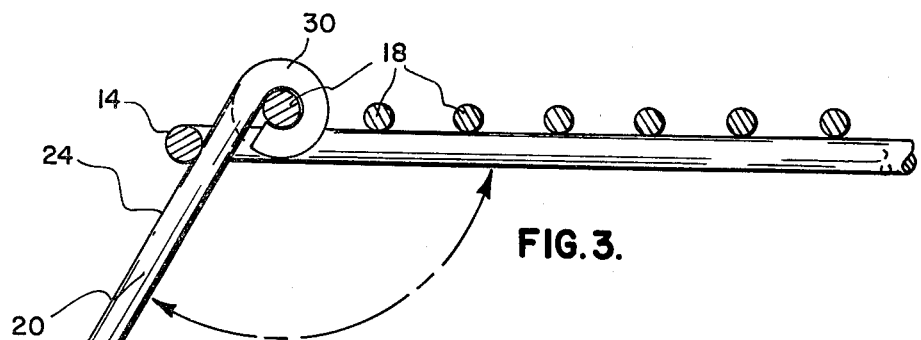
FIG. 3 is an enlarged fragmentary sectional view taken from the line 3—3 of FIG. 1.

Attention is directed to FIGS. 3 and 4 of the drawings, wherein the leg 20 is shown in downwardly diverging position relative to the leg 22, and wherein the upper loop end 30 of a leg portion 24 of the leg 20 is pivoted on one of the grill bars 18 and wherein the frame portion 14 is below the grill bar so as to provide a pivotal stop for the leg 20 as it is disposed in diverging relation to the leg 22, for supporting the grill of the invention.

Likewise, the leg 36, shown in FIG. 4, at its loop portions 43 and 44, is pivoted on the frame portion 12 and is engaged with the brace bar portion 52 of the respective brace member 46 when the legs 34 and 36 are in downwardly diverging position as shown in FIGS. 1 and 4 of the drawings.

It will be seen that the legs 20 and 22 are pivoted to the grill on axes parallel with the grill bars 18, while the legs 34 and 36 are pivoted on axes at substantially right angles to the grill bars 18, and support intermediate portions of the grill between the legs 20 and 22. This allows the use of light gauge wire and consequently provides for the compact lightweight construction of the barbeque grill of the invention.

As shown in FIG. 3 of the drawings, it will be seen that the leg portions of the leg 20 are engaged with the frame portion 14 below the level of grill bars 18 and, as shown in FIG. 4 of the drawings, the portions of the leg 34 are braced against the brace member 46 which is disposed below the frame portion 12, and that the grill bars 18 are disposed on the upper portion of the frame portion 12.

As shown in FIGS. 1 and 2 of the drawings, a pair of struts 54 and 56 are disposed for bracing the legs 20 and 22, respectively, in a triangular relation to the frame and grill bars of the invention.

Only the strut 54 will be described in detail.

The strut 54 is provided with a first slide loop 58 which is slidable on a grill bar 18 disposed substantially centrally of the grill of the invention, and a cross bar 60 forms a stop for slide loop portion 58 while the strut 54 is provided with another slide loop 62 and its opposite end engageable with a stop 64 on the leg portion 24 of the supporting leg 20.

It will be seen, as shown in FIGS. 1 and 2 of the drawings, that the strut 54 provides for a triangular bracing of the leg 20 and the frame portions 10 and 12 when in operating position as shown in FIG. 2, wherein the legs 20 and 22 are disposed in downwardly diverging relation to each other. The strut 54 may assume a broken line position 66, as shown in FIG. 1 of the drawings, when the leg 20 is pivoted upward into substantially parallel position with a plane of the grill bars 18, and this is accomplished by sliding of the slide loop 58 to a position adjacent the frame portion 12, all as indicated by broken lines in FIG. 1 of the drawings.

It will be seen that when the strut 54 is in operative solid line position, as shown in FIGS. 1 and 2, that the slide loop 58 engages the stop bar 60 and the stop 64 on one of the grill bars 18 and the leg portion 24 respectively.

Coupled to the legs 34 and 36 are 68 and 70, respectively, and for purposes of description, the strut 70 will be hereinafter described in detail. This strut 70 is provided with a pivot loop 72 pivotally mounted on and surrounding a bearing bar 74 which interconnects the leg portions 38 and 40 of the leg 36. The strut 70, at its opposite end, is provided with a slide loop 76, slidable on one of the grill bars 18 and engageable with the stop bar 60 so that when the auxiliary legs 34 and 36 are in downwardly diverging relation as shown in FIG. 1 of the drawings, that the strut 70 triangularly braces respective auxiliary leg 36 relative to the frame and grill bars, all as shown best in FIGS. 1 and 2 of the drawings.

Figure 5:
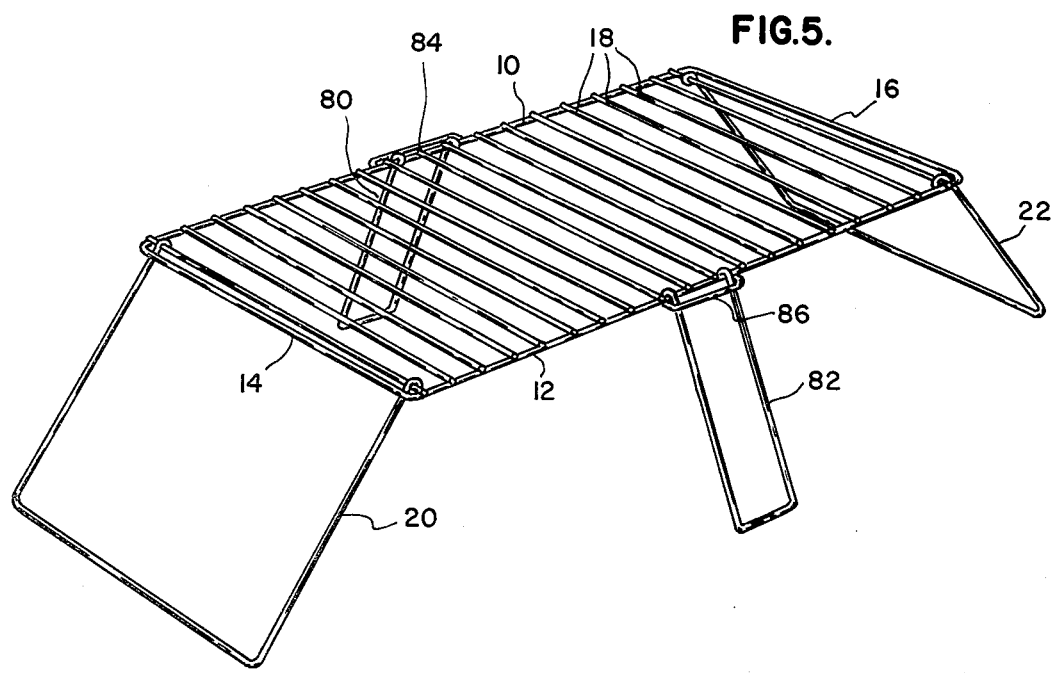
FIG. 5 is a perspective view of a modification of the invention showing the barbeque grill similar to that as shown in FIGS. 1 and 2, without triangular bracing between the grill bar and the supporting legs.

In the modification as shown in FIG. 5, it will be seen that the legs 20 and 22 may be similar to that as shown in FIG. 1 of the drawings, and that modified auxiliary legs 80 and 82 may be utilized, and that brace struts may not be required depending upon the size of the grill.

The auxiliary legs 82 are pivoted on the frame portions 10 and 12 and are engageable with brace members 84 and 86, which are similar to the hereinbefore described brace members 45 and 46.

It will be appreciated that inasmuch as the support legs 20 and 22 are assisted by the auxiliary legs 34 and 36, that the barbeque grill of the invention may be made of lightweight material and may support very substantial loads over a hot fire.

For additional strength, the struts 54 and 56 may be utilized as shown in FIGS. 1 and 2 of the drawings, and for a relatively smaller grill these struts may be omitted and the grill may be constructed as shown in FIG. 5 of the drawings, all of which provides for versatility in the manufacture of grills of various sizes for various loads while making such grills of small gauge wire and therefore economical and of light weight.

Figure 6:
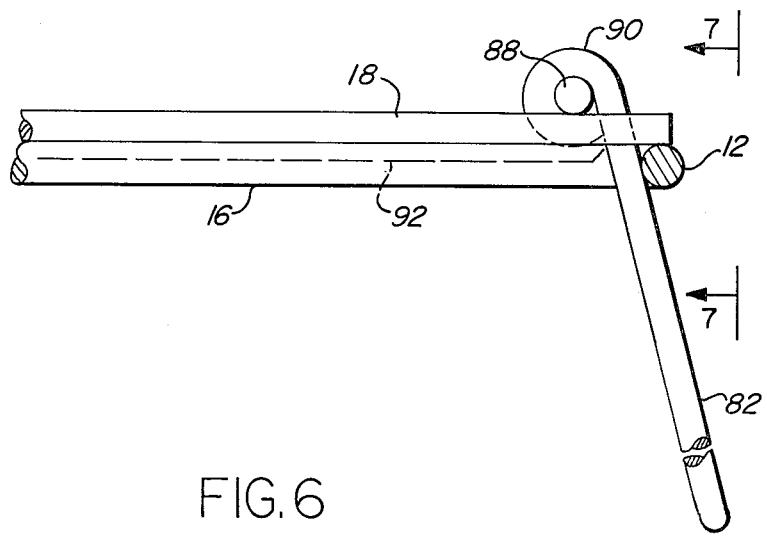
FIG. 6 is a fragmentary sectional view similar to FIG. 4, but showing a modification of the structure disclosed in FIG. 4.
Figure 7:
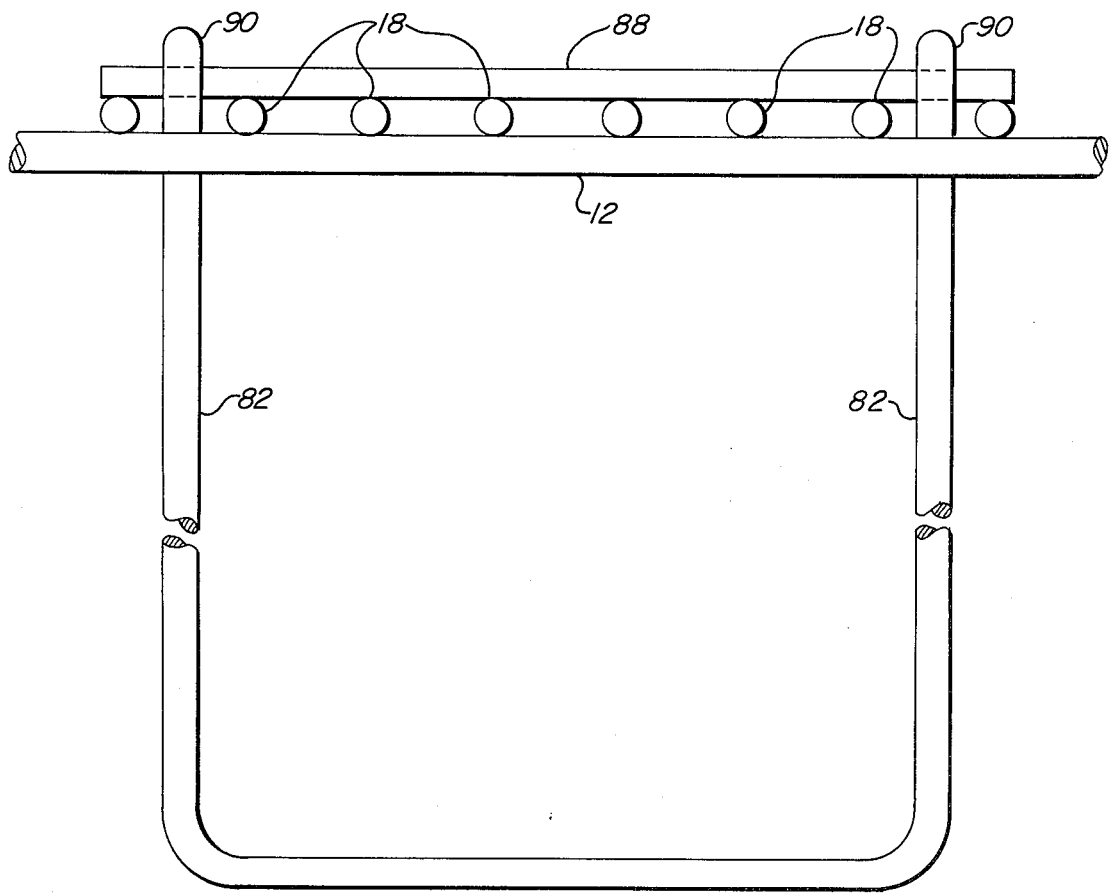
FIG. 7 is a fragmentary elevational view taken from the line 7—7 of FIG. 6.

In the modification as shown in FIGS. 6 and 7, the leg brace structure, disclosed therein, is adapted to be substituted for the leg brace structure shown in FIGS. 4 and 5, and particularly for use as a substitution or modification of the elements 80 and 82 and the brace bars 84 and 86 shown if FIG. 5.

As shown in FIG. 6, a bearing bar 88 is secured on the grill bars 18, transversely relative thereto and is spaced from the frame portion 12 so that the support legs 82 bear against the frame portion 12 in such position that the legs 80 and 82 diverge outwardly from each other, it being noted that the modification related to both legs 80 and 82 in opposed relationship to each other.

It will be seen that the bearing loop portions 90 on the upper ends of the legs 82 are suppositioned that the legs 82 may be pivoted into a broken line position 92 adjacent to the grill bars 18.

As shown in FIG. 7, the bearing bar 88 is adapted to abridge only several of the grill bars 18 and is preferably welded thereto and the grill bars 18 are welded to the frame portions 10 and 12 as hereinbefore described. The horizontal bearing and support portions 28 of the legs 20 and 22 are pivoted into broken line positions 23 as shown in FIG. 2 such that the portions 28 are within the outline of the frame between the members on portions 10 and 12, and the portions 28 are slightly spaced from each other. This arrangement is particularly desirable when the grill is made in small sizes without the legs 80 or 82 as shown in FIGS. 1 and 5.

It will be obvious to those skilled in the art that various modifications may be resorted to without departing from the spirit of the invention.

I claim:

1. In a barbeque grill, the combination of: a generally rectangular wire frame having first and second pairs of spaced apart frame portions; a plurality of spaced apart grill bars generally parallel with each other and fixed to normally upper sides of said first pair of frame portions; said grill bars being generally parallel to said second frame portions; a pair of generally U-shaped support legs; each support leg having a pair of spaced apart normally upwardly extending members provided with upper ends having bearing loops; the bearing loops of each U-shaped leg surrounding and pivoted on one of said grill bars in adjacent relation to one of said second pair of frame portions, whereby said second pair of frame portions are disposed below said grill bars and serve as stop braces for said upwardly extending members of said legs when said pair of legs are disposed in downwardly diverging relation to each other and thereby supporting said frame and said grill bars; and U-shaped legs each having a normally horizontal bearing and support portion at its lower extremity; said bearing and support portion being integral with said upwardly extending members and being of a continuous piece of wire; a brace member is provided with opposite ends which are connected to each of said first frame portions; each brace member having a brace bar portion spaced outwardly from each respective first frame member; a pair of generally U-shaped auxiliary legs each having a pair of spaced apart normally upwardly extending members provided with normally upper ends having bearing loops, said bearing loops of each U-shaped auxiliary leg surrounding and pivoted on one of said first frame portions in adjacent relation to a respective one of said brace members; each of said brace members having its brace bar portion disposed below a respective one of said first frame portions whereby said auxiliary legs, when supporting said first frame portions, extend in downwardly diverging relation to each other and said upwardly extending members of each auxiliary leg bearing against a respective brace bar portion; each one of said auxiliary legs having a normally horizontal bearing and support portion at its lower extremity; said last mentioned bearing and support portion being integral with respective upwardly extending members of said auxiliary legs and being of a continuous piece of wire.

2. The invention as defined in claim 1, wherein: a bearing bar is coupled to said upwardly extending members of said auxiliary legs; a strut having a first end is provided with a pivot loop surrounding and pivoted on said bearing bar; said strut having a second end provided with a slide loop surrounding and slidable on one of said grill bars; and stop means intersecting one of said grill bars and serving as a stop for said slide loop when said auxiliary legs are in diverging relation to each other; each bearing bar being spaced a considerable distance from a respective normally upper end of one of said auxiliary legs to provide for triangular bracing disposition of said strut and said auxiliary legs and said grill bars.

3. The invention as defined in claim 1, wherein: a strut is provided with a first end having a first slide loop surrounding and slidable on one of said upwardly extending members of each of said U-shaped support legs; said strut having a second end provided with a second slide loop surrounding and slidable on one of said grill bars; first stop means on a respectively upwardly extending member; said first stop means engageable by said first slide loop when said U-shaped support legs are in diverging relation to each other; and second stop means on said one of said grill bars; said second stop means engageable by said second slide loop of said strut when said support legs are in diverging position; said first stop means being disposed in substantial spaced relation to said upper ends of said support legs whereby said strut and said grill bars and said support legs are disposed in triangular bearing relation to each other when said support legs are in diverging relation to each other; said strut, at said first and second ends, being slidable on said upwardly extending members and said grill bars into substantially parallel relation to a plane on which said grill bars are disposed when said support legs are pivoted into parallel relation to a plane on which said grill bars are disposed.

4. The invention as defined in claim 2, wherein said strut at said slide loop is slidable on a respective grill bar away from said stop means, whereby said strut slides to a position substantially parallel to a plane on which said grill bars are disposed when said auxiliary legs are pivoted into a position parallel to said grill bars.

5. In a barbeque grill, the combination of: an endless frame; a plurality of substantially parallel grill bars coupled thereto; support legs pivoted to said frame; struts pivoted to said support legs at positions normally below said frame; each one of said struts having a slide loop surrounding and slidable on one of said grill bars; stop means disposed to limit each respective slide loop in its movement along a respective grill bar so as to dispose said strut and a respective leg and one of said grill bars in triangular bracing position when said support legs are in a downwardly diverging relation to said frame and said frame is supported on said legs; said strut and said support legs pivotal into a position generally parallel to a plane on which said grill bars are disposed and relative to said frame for compactly collapsing said barbeque grill.

6. In a barbeque grill, the combination of: a generally rectangular wire frame having first and second pairs of spaced apart frame portions; a plurality of spaced apart grill bars generally parallel with each other and fixed to normally upper sides of said first pair of frame portions; said grill bars being generally parallel to said second frame portions; a pair of generally U-shaped support legs; each support leg having a pair of spaced apart normally upwardly extending members provided with upper ends having bearing loops; bearing bars secured to upper portions of said grill bars and disposed at substantially right angles to said grill bars and spaced from said first pair of frame portions; bearing loops of each U-shaped leg surrounging and pivoted on respective ones of said bearing bars in adjacent relation to one of said first pair of frame portions; whereby said first pair of frame portions are disposed below said grill bars and serve as stop braces for said upwardly extending members of said legs when said pair of legs are disposed in downwardly diverging relation to each other and thereby supporting said frame and said grill bars; said U-shaped legs each having a normally horizontal bearing and support portion at its lower extremities; said bearing and support portion being integral with said upwardly extending members and being of a continuous piece of wire.

7. The invention as defined in claim 6, wherein said legs are straight and said bearing loops are disposed such that said support legs may pivot into engagement with said grill bars.

8. In a barbeque grill, the combination of: a generally rectangular wire frame having first and second pairs of spaced apart frame portions; a plurality of spaced apart grill bars generally parallel with each other and fixed to normally upper sides of said first pair of frame portions; said grill bars being generally parallel to said second frame portions; a pair of generally U-shaped support legs; each support leg having a pair of spaced apart normally upwardly extending members provided with upper ends having bearing loops; the bearing loops of each U-shaped leg surrounding and pivoted on one of said grill bars in adjacent relation to one of said second pair of frame portions, whereby said second pair of frame portions are disposed below said grill bars and serve as stop braces for said upwardly extending members of said legs when said pair of legs are disposed in downwardly diverging relation to each other and thereby supporting said frame and said grill bars; said U-shaped legs each having a normally horizontal bearing and support portion at its lower extremity; said bearing and support portion being integral with said upwardly extending members and being of a continuous piece of wire; said legs are straight and said bearing loops are disposed such that said support legs may pivot into engagement with said grill bars.

* * * * *